United States Patent Office 3,221,036
Patented Nov. 30, 1965

3,221,036
DIHYDROCARBYLTIN COMPOUNDS OF
BIS-PHENOLS
Gustav Weissenberger, Zurich, Switzerland, assignor to Monsanto Company, a corporation of Delaware
No Drawing. Filed Jan. 26, 1961, Ser. No. 84,982
Claims priority, application Switzerland, Jan. 28, 1960, 926/60
14 Claims. (Cl. 260—429.7)

The present invention relates to a stabilizer for polymers, especially for halogen containing polymers. The novel stabilizer shows in its molecule at least one unit of the following formula

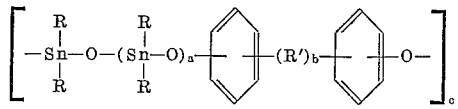

In this formula R and R' signify alkyl, aralkyl, cycloalkyl or aryl radicals which, in occurrence, can also have ethylenic or acetylenic unsaturations, $a$ is zero or a low integer, $b$ is zero or 1 and $c$ is an integer being in general low, thereby the term "low integer" means a number 1–10. The molecule consisting of one or several units as formulated above, or of one and a part of a such unit, can contain at the end position either hydroxyl groups being possibly etherified, or one hydroxyl group being possibly etherified and a further hydrocarbon radical, or further hydrocarbon radicals, or can be closed forming a cyclic structure. In the preferred stabilizer R and R' are hydrocarbon radicals having less than 20 cabon atoms, and more preferably R' is an aliphatic or cycloaliphatic hydrocarbon having up to 12 carbon atoms and R is an aliphatic hydrocarbon radical having from 4 to 12 carbon atoms.

The novel organotin compounds are obtained by condensation of dihydrocarbyltinoxides, dihydrocarbyltindichlorides or trihydrocarbyltinchlorides with bis-phenols or hemi-etherified bis-phenols. The term "hydrocarbyl" here is understood to be a hydrocarbon radical as defined above.

In a preferred manner of processing, an about equimolar mixture of a dihydrocarbyltinoxide and a bis-phenol is heated removing continuously the reaction water formed. By this method the reactants are suitably strongly refluxed in an inert solvent which builds an azeotrope with the reaction water to be removed, until no more water is formed and thus, the condensation is complete. Suitable solvents are, for example, benzene, cyclohexene, toluene, xylenes, etc.

The reaction water is conveniently separated in a water separator, for example, in a Dean-Stark apparatus. But, also water binding agents such as, for example, CaO, CaSO$_4$, CaCl$_2$, Na$_2$SO$_4$ etc., can be added to the water separator or, depending on the circumstances, also to the reaction vessel if the desiccating agent will be indifferent to the reactants. In general, under the conditions herein described the condensation is complete in about 1–3 hours using, for example, toluene as a sweeping agent for the originated reaction water. Thereby, per unit of molecule of the probably polymeric dihydrocarbyltinoxide put in the reaction is always formed at maximum only ½ mole of condensation water. After distillation of the solvent the isolation of the endproduct can be accomplished in conventional fashion. The endproduct can often be precipitated in the aromatic hydrocarbon solution, for example in toluene solution, by light petroleum, But, the stabilizers can also be added directly in the state of obtained solution to the polymer solutions to be protected, before they are worked up. Depending on the circumstances, one can also proceed without a solvent, heating the reaction mixture at a temperature above the boiling point of water and facilitating the elimination of water by causing a great surface or by strong stirring or by vacuum.

Another process also resulting in a product which contains a unit as formulated before, but as a rule, in that formula $a$ being zero and $c$ the number 1, comprises reacting dihydrocarbyltindichlorides or trihydrocarbyltinchlorides with metal bis-phenolates, especially alkaline-metal bis-phenolates, or with phenols in the presence of acid binding agents respectively. A modified process for producing products of the invention is based on the transesterification, for example, between a dihydrocarbyltindimethoxylate or trihydrocarbyltinmethoxylate and a bis-phenol, carried out in well-known manner. Another process for producing the new stabilizer compounds involves condensation of a trihydrocarbyltinoxide (hexahydrocarbylstannone, R$_3$SnOSnR$_3$) and a bis-phenol by removing continuously the reaction water. Still another process for producing products of the invention involves the condensation of a trihydrocarbyltinhydroxide (R$_3$SnOH) and a bis-phenol by removing continuously the reaction water. In general preferred reactants have hydrocarbon radical containing less than 20 carbon atoms. Using these alternative methods the bis-phenols may be hemi-etherified too.

Non limiting examples of dihydrocarbyltinoxides which can be condensed with bis-phenols or bis-phenol-monoethers according to the indicated methods are: Dimethyltinoxide, diethyltinoxide, divinyltinoxide, di-n-propyltinoxide, di-iso-propyltinoxide, dipropenyltinoxide, diallyltinoxide, di-n-butyltinoxide, dioctyltinoxide, dilauryltinoxide, disteryltinoxide, dioleyltinoxide, dibenzyltinoxide, distyryltinoxide, dicinnamyltinoxide, diphenyltinoxide, dicyclopentyltinoxide, dicyclohexyltinoxide, dicyclohexenyltinoxide, dicyclohexadienyltinoxide, etc. or instead of the tin oxides, the corresponding dihydrocarbyltindihalides like, for example, dimethyltindichloride etc. or trihydrocarbyltinhalides like, for example trimethyltinchloride etc. Of course, the hydrocarbon radicals may also be different from one another, but the symmetrically substituted starting products generally are preferred because of their easier availability. The choice of the hydrocarbon radicals being on the tin atom will be directed by the compatibility of the endproducts with the polymers to be stabilized. In general, the aliphatic hyrocarbon radicals having 4–12 carbon atoms in their molecule, or the cycloaliphatic hydrocarbon radicals are preferred.

Non limiting examples of bis-phenols which can be reacted with the defined dihydrocarbyltinoxides, dihydrocarbyltindichlorides or trihydrocarbyltinchlorides according to the mentioned methods are: 4,4'-dihydroxybiphenyl, 1,1-bis-(p-hydroxyphenyl)-ethane, 1,1-bis-(o-hydroxyphenyl)-ethane, 1,1-bis-(m-hydroxyphenyl)-ethane, 1,1-bis-(p-hydroxyphenyl)-phenylmethane, 1,1-bis-(p-hydroxyphenyl)-methane, 1,1-bis-(p-hydroxyphenyl)-propane, 2,2-bis-(p-hydroxyphenyl)-propane, 1,3-bis-(p-hydroxyphenyl)-propane, 1,1-bis-(p-hydroxyphenyl)-iso-butane, 2,2-bis-(p-hydroxyphenyl)-n-butane, 1,1-bis-(p-hydroxyphenyl)-heptane, 1,1-bis-(p-hydroxyphenyl)-octane, 1,1-bis-(p-hydroxyphenyl)-dodecane, 1,1-bis-(p-hydroxyphenyl)-octadecane, 1,1-bis-(p-hydroxyphenyl)-cyclopentane, 1,1-bis-(p-hydroxyphenyl)-cyclohexane, 1,1-bis-(o-hydroxyphenyl)-cyclohexane, 1,1-bis-(m-hydroxyphenyl)-cyclohexane, 1-(o-hydroxyphenyl)-1-(p-hydroxyphenyl)-cyclohexane, 4,4'-dihydroxystilbene, etc. or the hemiethers thereof like, for example, 4-methoxy-4'-hydroxybiphenyl etc. The hydrocarbon radicals can also be varied within wide limits so long as the end products preserve a melting point appropriate for the future use and a good compatibility with the polymer and the plasticizer, and the substitution on the aliphatic radical can be other than 1, 1.

According to the first process comprising a condensation of dihydrocarbyltinoxides and bis-phenols under continuous removal of the reaction water, thereby a successive disintegration if the starting polymeric organotin compound and simultaneous condensation occurs, there is always obtained at maximum only ½ mole of reaction water per mole of dihydrocarbyltinoxide used in the reaction, without care for an excess (more than 0.5 mole) of the bis-phenol. From the analysis and maximum amount of formed water can be concluded, that the condensation product prepared according to the process of invention contains 2 molecules of dihydrocarbyltinoxide per molecule of bis-phenol. From physical analysis results, that the reaction product probably is composed of 4–6 units having the formula as set forth. Further it was found that the reaction product must possess a cyclic structure, since no hydroxyl group can be detected neither by infrared analysis nor by hydroxyl reagents like, for example, diazomethane or phenylisocyanate. The executed viscosity measurements also confirm a cyclic configuration. It is noteworthy, that the similar products prepared by the same method from alcohols, alkanediols, alkenediols, alkinediols or simple phenols are very sensitive against hydrolysis, in contrast to the compounds of invention prepared from bis-phenols.

As already mentioned, a product containing the above formulated unit can also be obtained reacting dihydrocarbyltindichlorides or trihydrocarbyltinchlorides with bis-phenols or hemi-ether of bis-phenols. While the compounds prepared according to the first mentioned, preferred process, as a rule, have in their molecule several units as formulated in the beginning and possess no terminal hydroxyl groups but have a cyclic structure and the proportion of bis-phenol to Sn is always 1:2, the compounds prepared according to the last mentioned, second process have, as a rule, only 1 of the defined units, terminal hydroxyl groups, ether groups, resp., or one hydroxyl group, ether group respectively and a further hydrocarbon radical, or further hydrocarbon radicals and the proportion of bis-phenol to Sn is 1:1 to 2:1, depending on the stoichiometric ratio of the used reactants, thereby, if several tin atoms are present, they are never joined by oxygen, but by bis-phenol. Organotin compounds of the last mentioned kind are not so suitable as stabilizers, if they contain, especially on the tin atom free hydroxyl groups. Thus, among the various compounds obtainable according to the second process, only those have importance as stabilizers which possess one of the following formulas:

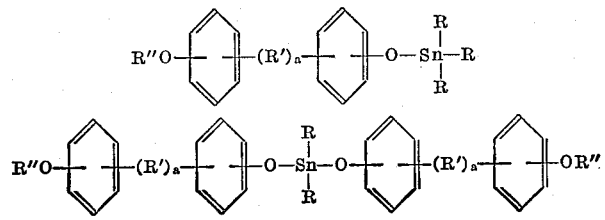

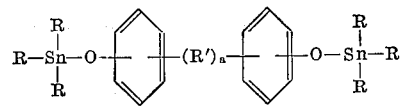

In these formulas are R, R' and a defined as before and R'' is a hydrogen atom or preferably an aliphatic hydrocarbon radical. These preferred compounds are obtained reacting 1 mole of trihydrocarbyltinchloride with 1 mole of bis-phenol-mono-ether, or 2 mole of trihydrocarbyltinchloride with 1 mole of bis-phenol, or 1 mole of dihydrocarbyltindichloride with 2 moles of bis-phenol, bis-phenol-mono-ether respectively in usual manner in the presence of an acid binding agent under exclusion of humidity.

But, the higher molecular cyclic products obtainable according to the first process will be quite generally preferred as stabilizers. The stability of these compounds towards hydrolysis which can be prepared from dihydrocarbyltinoxides and bis-phenols was surprising with respect to the well-known instability of similar compounds, that must be due to the particular structure of these organotin compounds. Because of the higher molecular weight, these novel stabilizers show practically no volatility. Thus, are fulfilled the required qualities in this concern, such as stability against atmospheric influences and humidity and a low vapor pressure, which a good stabilizer must possess. Further, they show a strong absorption in the UV range and for this reason they are able also to protect the polymers against the deleterious influence of the light rays having short wave length.

The stabilizers of invention are advantageously employed for the stabilization of polyvinylchloride, co-polymers having a portion of vinylchloride, chlororubber, polychloroprene, polyvinylidenechloride, co-polymers having a portion of vinylidenechloride, re-chlorinated polyvinylchloride, re-chlorinated co-polymers of vinylchloride, chlorinated polyethylene, chlorinated co-polymers of ethylene and for mixtures of these polymers. Generally, additions of 0.5–5% are sufficient to prevent largely the appearance of decomposition, which is effected by the influence of heat and light in the polymers during their treatment, or in the objects manufactured thereof, that can be proved by comparison with polymers having no admixture. A typical formulation contains a stabilizer of the invention is: 100 parts of polyvinylchloride, 50 parts of di-(2-ethylhexyl)-phthalate plasticizer, 1 to 3 parts of the product of Example 1, and 0.5 part of stearic acid. Typically, whether the polymer contains a plasticizer, the polymer will be present in the formulation in major amount. If desired stock mixtures of the stabilizers with polymers can be prepared, e.g., polyvinylchloride and 50–100% of a stabilizer of the invention giving a free-flowing powder suitable for blending back to the desired low concentration of stabilizer needed to protect the chlorinated polymer. The stabilizers of the invention are also bactericides and fungicides.

It stands to reason that the novel stabilizers can be combined with well-known means like basic lead carbonate, dibasic lead phosphite, epoxy compounds, urea derivatives and especially with metal soaps like calcium, barium, cadmium, lead and tin soaps.

*Example 1*

24.8 g. of dibutyltinoxide (0.1 mole), 22.8 g. of 2,2-(4,4'-dihydroxydiphenyl)-propane (0.1 mole) and 220 ml. of toluene are mixed and refluxed using a water separator (in this case a Dean-Stark apparatus). After 1 hour the condensation is complete. The amount of azeotropically distilled water is about 0.05 mole. The solvent is distilled off and the residue freed from excess of bis-phenol by washing with ether. The remaining reaction product is a white powder; M.P. 272–275° C. (dec.).

Analysis: Percent Sn calc. 33.5. Found 33.4.

By the same way and using 1,1-(4,4'-dihydroxydiphenyl)-propane is obtained the corresponding condensation product.

Example 2

24.8 g. of dibutyltinoxide (0.1 mole), 21.4 g. of 1,1-(4,4'-dihydroxydiphenyl)-ethane (0.1 mole) and 210 ml. of toluene are mixed and refluxed, using a water-separator (in this case a Dean-Stark apparatus). As soon as the amount of azeotropically distilled water is about 0.05 mole, the solvent is distilled off and the residue freed from excess of bis-phenol by washing with ether. The remaining reaction product is a white powder.

Analysis: Percent Sn calc. 33.1. Found 33.0.

Example 3

24.8 g. of dibutyltinoxide (0.1 mole), 24.2 g. of 1,1-(4,4'-dihydroxydiphenyl)-butane (0.1 mole) and 210 ml. of toluene are mixed and refluxed, using a water-separator (in this case a Dean-Stark apparatus). As soon as the amount of azeotropically distilled water is about 0.05 mole, the solvent is distilled off and the residue freed from excess of bis-phenol by washing with ether. The remaining reaction product is a white power.

Analysis: Percent Sn calc. 32.9. Found 32.8.

Example 4

24.8 g. of dibutyltinoxide (0.1 mole), 28.4 g. of 1.1-(4,4'-dihydroxydiphenyl)-heptane (0.1 mole) and 240 ml. of toluene are mixed and refluxed, using a water-separator (in this case a Dean-Stark apparatus). As soon as the amount of azeotropically distilled water is about 0.05 mole, the solvent is distilled off and the residue freed from excess of bis-phenol by washing with ether. The remaining reaction product is a white powder; M.P. 245–255° C.

Example 5

24.8 g. of dibutyltinoxide (0.1 mole), 25.4 g. of 1.1-(4,4'-dihydroxydiphenyl) cyclopentane (0.1 mole) and 230 ml. of toluene are mixed and refluxed, using a water-separator (in this case a Dean-Stark apparatus). As soon as the amount of azeotropically distilled water is about 0.05 mole, the solvent is distilled off and the residue freed from excess of bis-phenol by washing with ether. The remaining reaction product is a white powder; M.P. 274–277° C. (dec.).

Example 6

47.2 g. of dilauryltinoxide (0.1 mole), 22.8 g. of 2,2-(4,4'-dihydroxydiphenyl)-propane (0.1 mole) and 220 ml. of toluene are mixed and refluxed using a water-separator (in this case a Dean-Stark apparatus). After about 1 hour the condensation is complete. The amount of azeotropically distilled water is about 0.05 mole. The solvent is distilled off and the residue freed from excess of bis-phenol by washing with ether. The remaining reaction product is a white powder: M.P. 165–175° C. (dec.).

Example 7

18.8 g. of divinyltinoxide (0.1 mole), 28.4 g. of 1,1-(4,4'-dihydroxydiphenyl)-heptane and 240 ml. of toluene are mixed and refluxed, using a water-separator (in this case a Dean-Stark apparatus). As soon as the amount of azeotropically distilled water is about 0.05 mole, the solvent is distilled off and the residue freed from excess of bis-phenol. The remaining reaction product is a white powder.

Example 8

Equimolar amounts of liquid dibutyltinoxide and of 2,2-(4,4'-dihydroxydiphenyl)-propane are mixed and heated. The water formed during the reaction is removed from the melt by applying high vacuum. The condensation product is a colorless liquid; $n_D^{20}$ 1.5356.

Analysis: Percent C calc. 58.09; found 58.08. Percent H calc. 8.50; found 8.56. Percent Sn calc. 29.5; found 29.4.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, the phenyl radicals of the bis-phenol can have non-interfering substituents, methyl groups and the like. Further, the term hydrocarbon has been used in its broader sense, in that reactants and products as described above can also contain constituents other than carbon and hydrogen which are non-reactive or at least which do not interfere with the desired stabilizer-forming reaction or with the use of the stabilizer. One skilled in the art will recognize that a compound containing a non-interfering group is the equivalent of the corresponding hydrocarbon containing only carbon and hydrogen. Accordingly, modifications are contemplated which can be made without departing from the spirit of the described invention.

What is claimed is:

1. Cyclic compositions having at least one unit of the formula

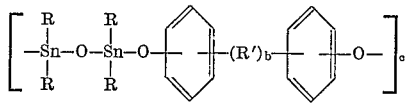

wherein R and R' are hydrocarbon radicals, b is an integer from 0 to 1 and c is an integer from 1 to 10.

2. Compositions of claim 1 wherein R is aliphatic and has between 4 and 12 carbon atoms, R' is aliphatic and has up to 12 carbon atoms.

3. Compositions of claim 2 wherein R is butyl and R' is the 2,2-propane diradical.

4. Compositions of claim 2 wherein R is butyl and R' is the 1,1-ethane diradical.

5. Compositions of claim 2 wherein R is lauryl and R' is the 2,2-propane diradical.

6. Compositions of claim 1 wherein R is butyl, R' is the 1,1-cyclopentane diradical.

7. Compositions of claim 1 wherein R is vinyl, R' is the 1,1-heptane diradical.

8. Process for preparing compositions of claim 1 comprising heating 1 mole of a dihydrocarbyltinoxide of the formula $R_2SnO$ and at least about 0.5 mole of a bis-phenol having the formula

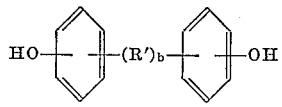

wherein R, R' and b are as defined in claim 1, and continuously removing reaction water.

9. Process of claim 8 wherein R is aliphatic and has between 4 and 12 carbon atoms, R' is aliphatic and has up to 12 carbon atoms, and the reaction water is removed by an inert solvent in an azeotrope.

10. Process of claim 8 wherein R is butyl, R' is the 2,2-propane diradical, and toluene is present to form an azeotrope with the reaction water.

11. Process of claim 8 wherein R is butyl, R' is the 1,1-cyclopentane diradical, and toluene is present to form an azeotrope with the reaction water.

12. Process of claim 8 wherein R is lauryl, R' is the 2,2-propane diradical, and toluene is present to form an azeotrope with the reaction water.

13. Process of claim 8 wherein R is vinyl, R' is the 1,1-heptane diradical, and toluene is present to form an azeotrope with the reaction water.

14. Process for preparing compositions of claim 1 comprising heating substantially equimolar amounts of liquid dibutyltinoxide and 2,2-(4,4'-dihydroxydiphenyl)-propane under high vacuum to cause the continuous removal of reaction water.

References Cited by the Examiner

UNITED STATES PATENTS

| | | | |
|---|---|---|---|
| 2,597,920 | 5/1952 | Carroll | 260—45.75 |
| 2,625,521 | 1/1953 | Fischer et al. | 260—45.75 |
| 2,626,953 | 1/1953 | Mack et al. | 260—45.75 |
| 2,789,105 | 4/1957 | Tomka et al. | 260—45.75 |
| 2,857,413 | 10/1958 | Weinberg et al. | 260—45.75 |
| 2,938,013 | 5/1960 | Mack et al. | 260—45.75 |
| 3,083,217 | 3/1963 | Sawyer et al. | 260—414 |
| 3,099,668 | 7/1963 | Zweigle | 260—429.7 |
| 3,113,144 | 12/1963 | Zweigle | 260—429.7 |
| 3,129,236 | 4/1964 | Weissenberger | 260—429.7 |

TOBIAS E. LEVOW, *Primary Examiner.*

ALPHONSO D. SULLIVAN, JOSEPH R. LIBERMAN, LEON J. BERCOVITZ, *Examiners.*